No. 715,126. Patented Dec. 2, 1902.
A. NODON.
RECTIFIER FOR SINGLE OR POLYPHASE ALTERNATING CURRENTS.
(Application filed Apr. 30, 1902.)
(No Model.) 2 Sheets—Sheet 1.

Witnesses:
Paul Hunter
Walton Harrison

Inventor
Albert Nodon
By Munn
Attorneys

No. 715,126. Patented Dec. 2, 1902.
A. NODON.
RECTIFIER FOR SINGLE OR POLYPHASE ALTERNATING CURRENTS.
(Application filed Apr. 30, 1902.)

(No Model.) 2 Sheets—Sheet 2.

Witnesses:

Inventor
Albert Nodon
By Munn
Attorneys

UNITED STATES PATENT OFFICE.

ALBERT NODON, OF PARIS, FRANCE.

RECTIFIER FOR SINGLE OR POLYPHASE ALTERNATING CURRENTS.

SPECIFICATION forming part of Letters Patent No. 715,126, dated December 2, 1902.

Application filed April 30, 1902. Serial No. 105,328. (No model.)

*To all whom it may concern:*

Be it known that I, ALBERT NODON, a citizen of the Republic of France, residing at 97 Rue Saint-Lazare, Paris, France, have invented certain new and useful Improvements Relating to Rectifiers for Single or Polyphase Alternating Currents, of which the following is a specification.

This invention relates to a species of electric valve or rectifier of single or polyphase alternating currents. This rectifier mainly consists of an electrolyte formed of a saturated solution of bibasic phosphate of ammonia $PO_4H(NH_4)_2$ employed either by itself or in presence of a phosphate of any one of the following metals or oxids: alumina, iron, copper, lime, or magnesia, in which solution are dipped two electrodes, one of which— viz., the active electrode—is made of an alloy of aluminium and zinc in the proportion of ninety-five per cent. of aluminium and five per cent. of zinc, while the other or passive electrode is constructed of iron, steel, or cast-iron, or of a combination of iron, cast-iron, and steel, (or any two of them,) or of a combination of iron with carbon, silicon, tungsten, molybdenum, or tantalum.

The rectifier is represented in the accompanying drawings, in which—

Figures 1, 3:
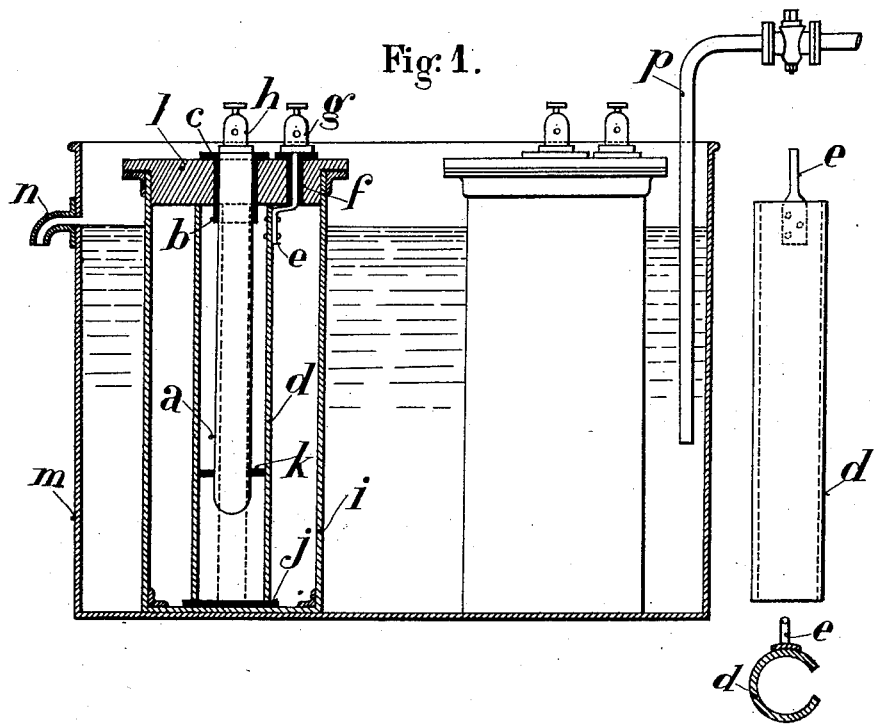
Figure 2:
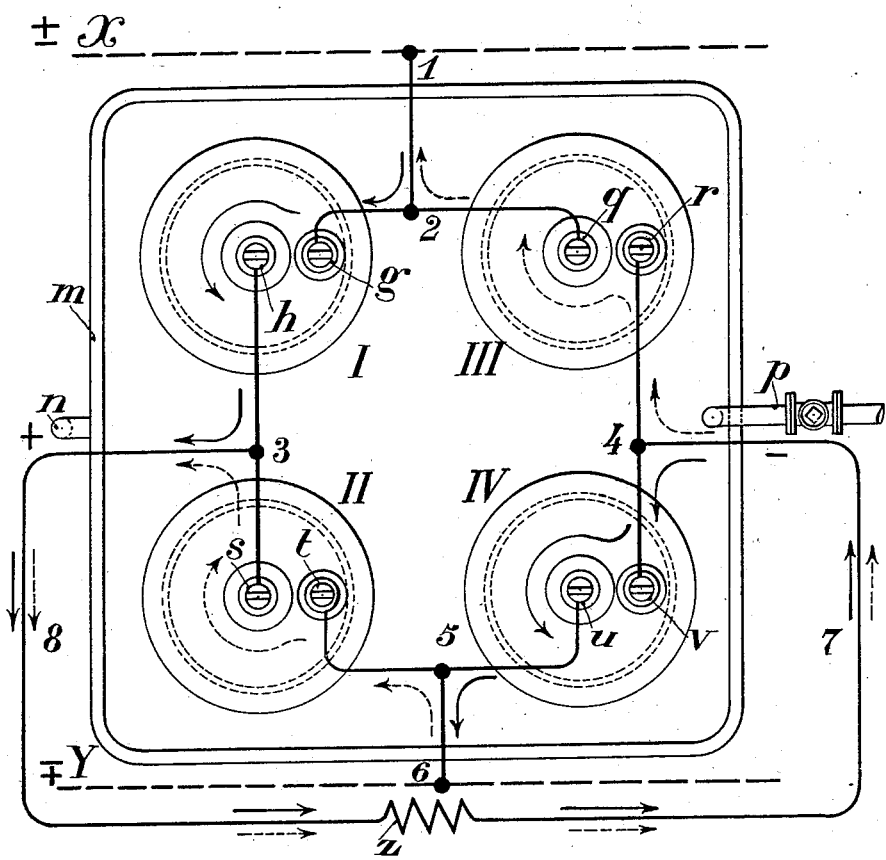

Figure 1 is a sectional elevation of a rectifier constructed in accordance with this invention. Fig. 2 illustrates the method of fitting together four rectifiers into a battery, and Fig. 3 comprises an elevation and a horizontal section of an iron electrode.

The rectifier consists of an electrode $a$, of zinc and aluminium alloy, constructed, preferably, in the shape of a cylindrical rod terminating at one end in a spherical dome and at the other end in a terminal $h$. This rod fits with frictional contact in an india-rubber sleeve $b$, provided with a flange $c$. The rectifier furthermore comprises an iron electrode $d$, consisting of a sheet of iron about two millimeters deep wound in cylindrical shape and slotted along the generatrix (or outline) of the cylinder. This cylinder has riveted or otherwise secured to its upper part a terminal $e$, with an india-rubber sleeve $f$, provided with a flange similar to the flange $c$. This terminal $e$ communicates with a terminal $g$.

The two electrodes $a$ and $d$ dip in a sheet-iron receiver $i$, enameled both inside and out. The electrode $d$ rests upon an india-rubber washer $j$, and into such electrode $d$ is inserted the electrode $a$, which is kept out of contact with $d$ by means of an india-rubber washer $k$. An ebonite disk $l$ serves to close the receiver $i$ at the top, being provided with suitable apertures for the passage of the rod $a$ and terminal $e$.

A battery consists of four like rectifiers arranged within a sheet-iron receiver $m$, fitted with an overflow-pipe $n$. A pipe $p$ descends to about mid-height of the receiver $m$ and communicates with any suitable water-supply.

The connection between the four rectifiers of a battery is made on what is known as the "Leo Gratz" system, as follows: The electrodes $h$ and $s$, of zinc and aluminium alloy, belonging to rectifiers 1 and 2, are connected together, and so are, on the other hand, the iron electrodes $r$ and $v$ belonging to the rectifiers 3 and 4. Then the iron electrode $g$ of rectifier 1 is connected to the zinc and aluminium electrode $q$ of rectifier 3, and, lastly, the iron electrode $t$ of rectifier 2 is connected to the zinc and aluminium electrode $u$ of rectifier 4. The connections $g\,q$ and $t\,w$, respectively, are now connected to the alternating current at $x$ and $y$, respectively, by the wires 2 1 and 5 6. The connections $h\,s$ and $r\,v$ are connected to the working circuit, represented by a resistance $z$, by the wires 3 8 $z$ and 4 7 $z$, respectively. During one phase the current follows the course 1 2 $h$ 3 8 $z$ 7 4 $v\,u$ 5 6, whence it returns to the alternating current at $y$, and during the other phase it follows the route 6 5 $t\,s$ 3 8 $z$ 7 4 $r\,q$ 2 1, whence it returns to the alternating current at $x$.

The electromotive force of the rectified current may be varied at will by the introduction of a variable self-induction resistance into the circuit of the alternating current.

A substantially continuous current may be obtained in the working circuit by the interposition of a second resistance into the line of the working circuit, (4 7 or 3 8.)

Neither the zinc and aluminium electrode nor the iron electrode is liable to any appreciable wear, nor does any change take place in the composition of the electrolyte. The currents thus rectified may be used in a variety of ways, either in charging accumulators or in feeding continuous-current arc-lamps or again in actuating continuous-current electromotors.

When it is desired to charge accumulators, the current is sent into the battery direct in the usual manner, regulation taking place, however, by means of self-induction resistances instead of by ohmical resistances.

Continuous-current arc-lamps are worked in the same way as if an ordinary continuous current were used, any flashing or sparking of the lamp being obviated by the addition of a second self-induction resistance, either at 4 7 or 3 8, the application to electromotors being, as usual, controlled by means of a self-induction resistance.

The method of fitting the rectifiers, as described above, applies to single alternating currents. When it is desired to apply it to a polyphase current, a greater number of rectifiers should be used in making up a battery; monophase current requiring four rectifiers; triphase current, six rectifiers.

The tension or pressure of the current should not in practice be less than one-tenth ampere per square centimeter of surface of the active zinc aluminium electrode, it being readily understood that the surface of the electrodes and the dimensions of the apparatus may vary according to the amperage required.

The tube $p$ serves to supply the outer receiver $m$ with cooling-water. If the cooling is to be effected by air, the several receivers $i$ may be provided with cooling-fans.

Large-sized rectifiers intended to be used for purposes of traction in connection with railways or for power transmission may take the shape of horizontal cylindrical cases of sheet-iron or alloy of zinc and aluminium. The cooling is effected by means of a current of air produced by a ventilator or fan. The air circulates in the interior over fans, affording a large cooling-surface.

Having now particularly described and ascertained the nature of my said invention and in what manner the same is to be performed, I declare that what I claim is—

1. An electrolytic transformer, comprising an electrolyte formed of a saturated solution of bibasic phosphate of ammonia $PO_4H(NH_4)_2$, a vessel for containing said electrolyte, electrodes made of alloyed metals, and terminals connected with said electrodes.

2. An electrolytic transformer, comprising an electrolyte, a vessel for containing the same, an electrode made of an alloy of ninety-five per cent. aluminium, and five per cent. zinc, and another electrode made of iron, or its alloys, and terminals connected with said electrodes.

3. In an electrolytic transformer, a vessel for containing an electrolyte, and a plurality of electrodes, one of which is composed of an alloy of ninety-five per cent. aluminium and five per cent. zinc.

4. In an electrolytic transformer, an electrode made of an alloy of aluminium ninety-five per cent., and zinc five per cent.

In witness whereof I have hereunto set my hand in presence of two witnesses.

ALBERT NODON.

Witnesses:
FELIX BARO,
EDWARD P. MACLEAN.